United States Patent [19]

Avrillon

[11] 4,162,087
[45] Jul. 24, 1979

[54] SELF-PROPELLED TRANSLATABLE WORKING UNIT FOR TRACTOR VEHICLE

[75] Inventor: Jean-Claude Avrillon, Vierzon, France

[73] Assignee: J. I. Case Company, Racine, Wis.

[21] Appl. No.: 845,759

[22] Filed: Oct. 26, 1977

[51] Int. Cl.² ............................................. B60D 7/00
[52] U.S. Cl. ................................ 280/460 A; 414/705
[58] Field of Search ........... 280/456 R, 456 A, 460 R, 280/460 A; 214/131 A, 768

[56] References Cited

U.S. PATENT DOCUMENTS

| | | | |
|---|---|---|---|
| 3,174,635 | 3/1965 | Auwelaer et al. | 280/456 R |
| 3,424,328 | 1/1969 | Gideonsen et al. | 214/768 |
| 3,922,007 | 11/1975 | Friedbach | 280/456 R |
| 3,993,206 | 11/1976 | Jomen et al. | 280/456 R |

FOREIGN PATENT DOCUMENTS

| | | | |
|---|---|---|---|
| 975029 | 11/1964 | United Kingdom | 280/456 R |
| 984383 | 2/1965 | United Kingdom | 280/456 R |

Primary Examiner—John A. Pekar
Attorney, Agent, or Firm—Cullen, Sloman, Cantor, Grauer, Scott

[57] ABSTRACT

The invention relates to a working unit adapted to be mounted on a vehicle, particularly an underground cable laying machine, said unit comprising an assembly support provided with at least one guide, a tool-holder chassis mounted to slide on the guide, drive means mounted on the tool-holder chassis and adapted to provoke the displacement of the tool-holder chassis along the whole of said guide, locking means adapted mechanically to lock the tool-holder chassis at all points of its path with respect to the guide.

7 Claims, 6 Drawing Figures

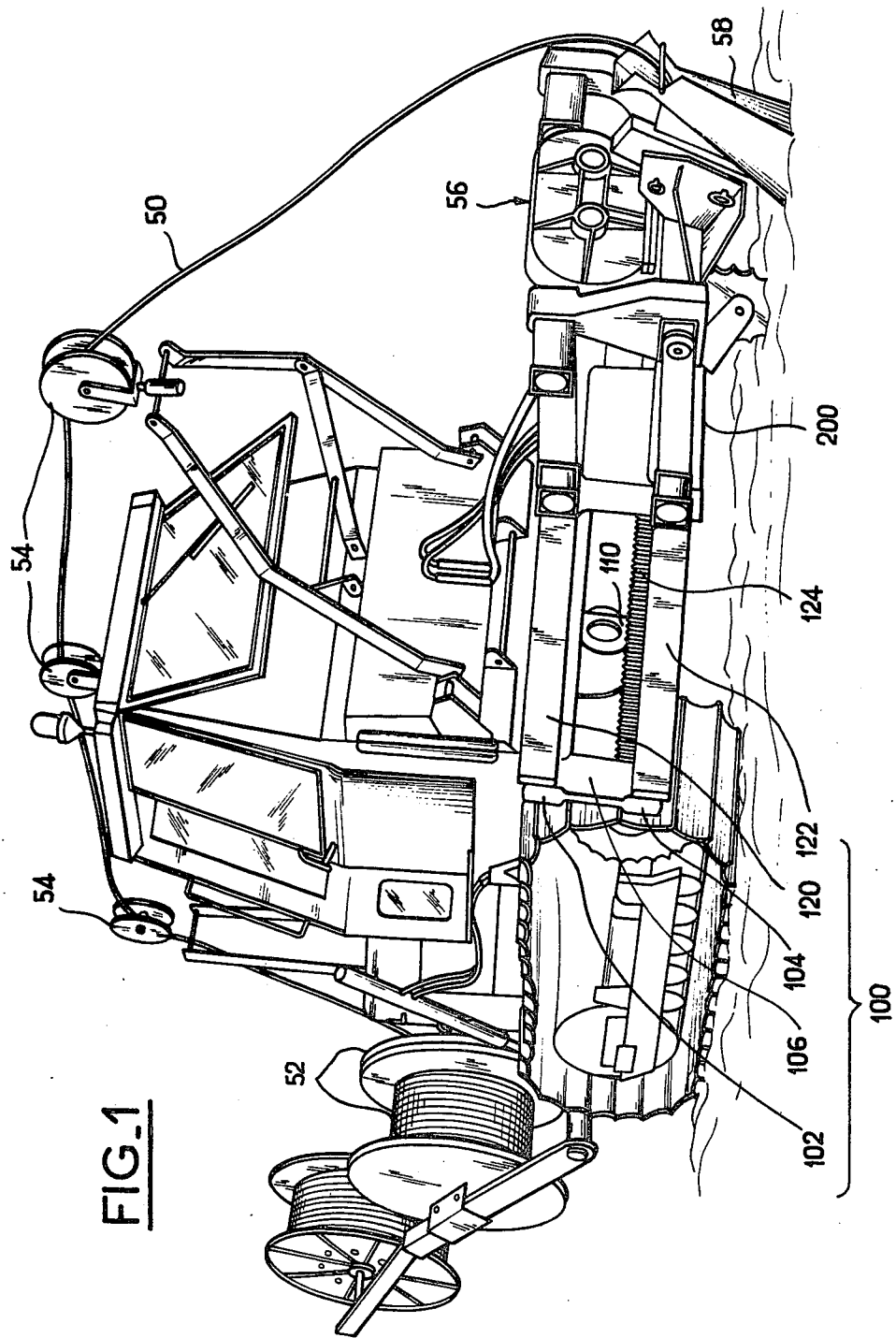

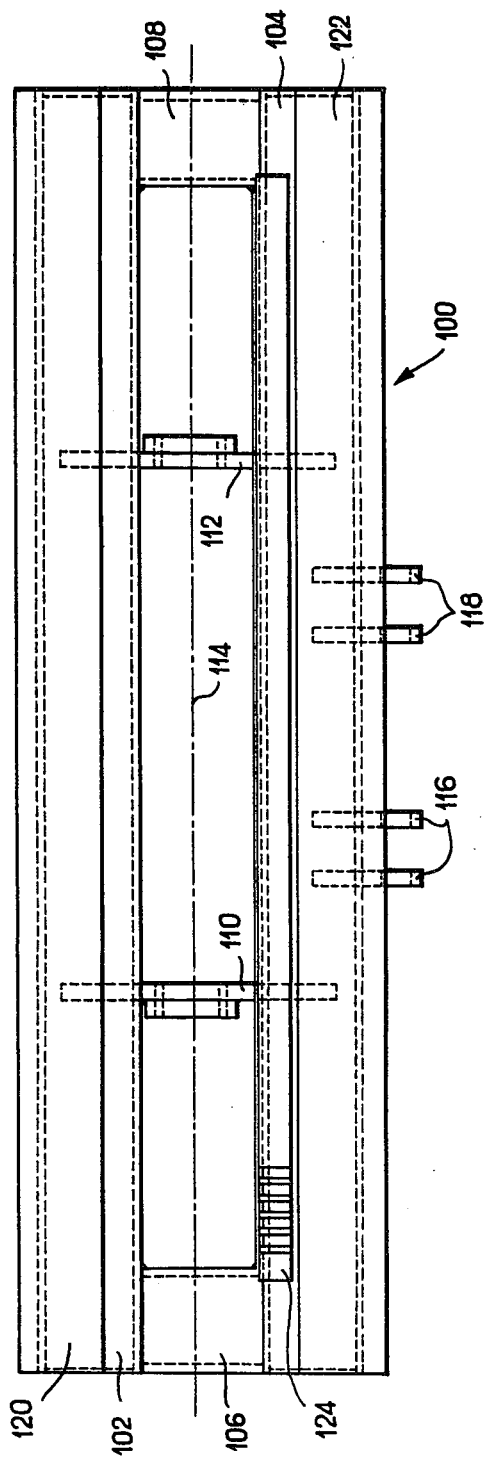
FIG._2
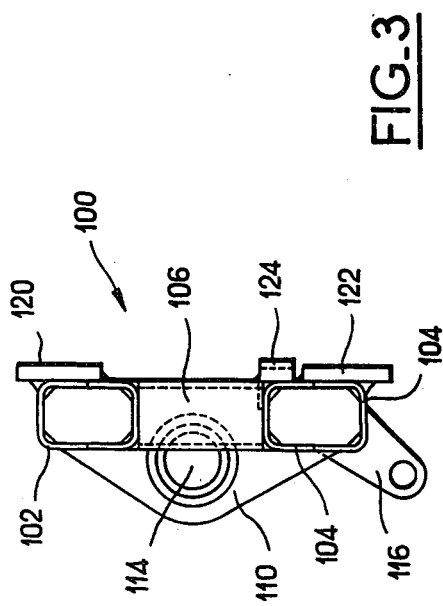
FIG._3

SELF-PROPELLED TRANSLATABLE WORKING UNIT FOR TRACTOR VEHICLE

BACKGROUND OF THE INVENTION

The present invention relates to self-propelled translatable working units for tractor vehicles.

SUMMARY OF THE PRIOR ART

Such units conventionally fit numerous civil engineering machines. For example, the working unit mounted on the vehicle may be a shovel, bucket, winch, etc. In particular, a tractor vehicle is already known which is provided in its front part with a cable-drum and in its rear part with a working unit comprising a vertical vibrating blade and a cable guide spout, this unit being employed for the underground laying of the cable in a trench made by the blade.

The working units thus associated with tractor vehicles are generally fixed with respect thereto.

However, in certain cases, it has appeared advantageous to provide a working unit adapted to be displaced with respect to the tractor vehicle. For example, in the case of a cable-laying vehicle, as indicated hereinabove, provided with a working unit disposed in the central axis of the vehicle, it is not possible to make a trench along a wall or on the shoulder of a road whose verge is not readily accessible; the arrangement of the working unit at the centre of the rear of the vehicle thus constitutes a serious limitation of use, and it appears desirable to be able to move the tool to a position appropriate for its use.

It is an object of the present invention to provide a working unit of the type mentioned hereinabove, adapted to displace a tool in translation over the whole width of the tractor vehicle, from the extreme left to the extreme right thereof.

It is another object of the invention to provide a working unit of the above-mentioned type adapted to be locked in all positions of the tool with respect to the tractor vehicle.

It is a further object of the invention to provide a working unit of the above-mentioned type adapted to impart to a tool either a pivoting movement about a transverse horizontal axis (lifting or lowering of the tool with respect to the ground), or a movement of rotation with respect to a vertical axis (swivelling of the tool).

SUMMARY OF THE INVENTION

The working unit according to the invention comprises, in combination, an assembly support provided with at least one guide, a tool-holder chassis mounted to slide on the assembly support, drive means mounted on the tool-holder chassis and adapted to provoke the displacement of the tool-holder chassis along the whole of said guide, locking means adapted mechanically to lock the tool-holder chassis at all points of its path with respect to the guide. The drive means are preferably constituted by a hydraulic motor driving a toothed pinion cooperating with a rack fixed to the chassis parallel to the guide.

The locking means are preferably constituted by a presser jack with notched piston head, whose direction is perpendicular to the rack and fixed to the tool-holder chassis. To effect locking, it is sufficient that the notches of the piston head mesh on the rack.

The assembly support advantageously comprises at least two bearings intended for the passage of a horizontal pivot shaft fast with the vehicle. In addition, pivot lugs are provided on which pivots at least one jack connected to the vehicle and intended to rotate said support about said horizontal axis.

Finally, the support preferably comprises two tool-support bearings constituting a vertical shaft for said latter. In order to manoeuvre the tool from the tractor vehicle, at least one jack is provided for manoeuvring the tool in rotation along said vertical axis. To this end, the jack may be fixed on pivot lugs provided for this purpose on the support.

Although it is of general use, the unit according to the invention is particularly adapted to a tool for laying a cable.

BRIEF DESCRIPTION OF THE DRAWINGS

FIG. 1 shows a rear view in perspective of a tractor machine provided with the device according to the invention.

FIG. 2 shows a front view of the assembly support for the device according to the invention.

FIG. 3 shows a left-hand view of said support;

DESCRIPTION OF THE PREFERRED EMBODIMENT

Figure 4:
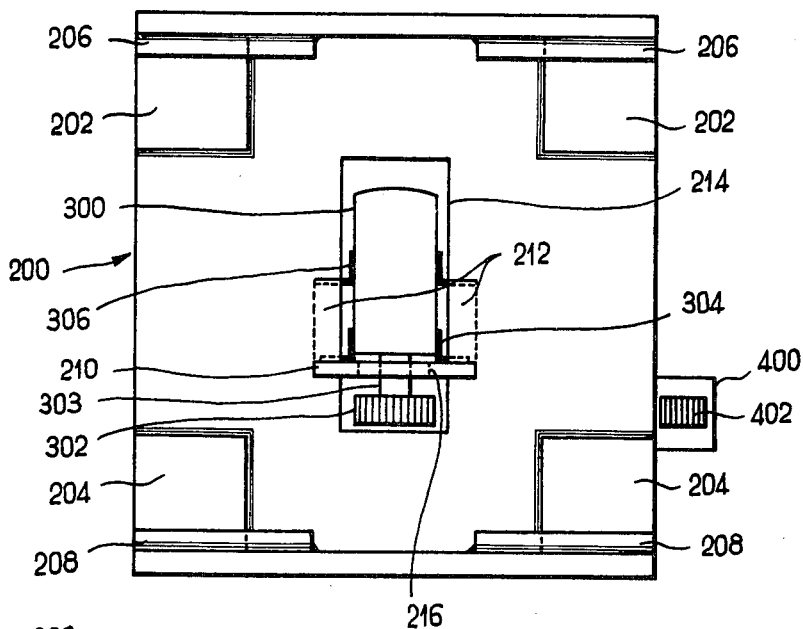
FIG. 4 shows a rear elevation of the tool-holder chassis according to the invention.

Referring now to the drawings, FIG. 1 shows a tracked machine comprising cable drums 52 serving to unwind a cable 50. Said cable passes through three guide pulleys 54 before being taken through a spout 58 penetrating the ground and belonging to tool 56. The device according to the invention, allowing the tool 56 to move across the rear width of the machine, is clearly visible in the Figure where the tool 56 is displaced towards the right of said Figure. To be essentially noted are the assembly support 100 constituted by two rectangular reinforcement tubes, a top one 102 and a bottom one 104 connected by cross-pieces 106. The support 100 comprises two horizontal guides, a top one 120 and a bottom one 122, on either side of a rack 124. 110 denotes one of the bearings allowing the connection of the support 100 with the tractor. The tool 56, associated with a tool-holder 200 of which only the lower part appears in the Figure, is mounted to slide on guides 120, 122.

FIG. 2 shows a front view of the assembly support 100 constituted by two rectangular reinforcement tubes 102 (upper) and 104 (lower), the two tubes being connected by two reinforcing cross-pieces 106 (left-hand) and 108 (right-hand), so as to form a frame on which are fixed an upper guide 120, a lower guide 122 and a rack 124 whose cogs are partially shown on the left-hand side of the Figure. 110 and 112 designate two bearings forming horizontal axis of rotation 114 whilst in the lower part of the support 100 appear two pairs of lugs 116 (left-hand) and 118 (right-hand) respectively on which jacks (not shown), fixed to the tractor are pivoted, thus ensuring the rotation of the support 100 about axis 114. It is obvious that portions of shaft fixed to the vehicle by any known means are inserted in the bearings 110 and 112.

FIG. 3 enables the preceding Figure to be more readily understood and shows the same elements. The rectangular structure of the reinforcement tubes 102 and 104 will be noted, whilst the orifices of the bearing 110 and the lugs 116 are clearly visible.

FIG. 4 shows a partial view of the rear part of the tool-holder chassis 200 which slides along the guides 120 and 122. 202 and 204 respectively denote two pairs of upper and lower blocks, square in shape, and adapted to come into contact against the smooth face of the guides 120 and 122. In order to maintain the tool-holder chassis 200 in fast contact with the support 100, two pairs of upper and lower longitudinal guide members 206 and 208 are provided which pass respectively behind the upper part of the guide 120 and behind the lower part of the guide 122 as may be seen in FIG. 3. Consequently, the tool-holder chassis is coupled against the assembly support, the only possible disconnection and connection being effected by sliding the tool-holder chassis to the end of the guides 120 and 122.

Figure 5:
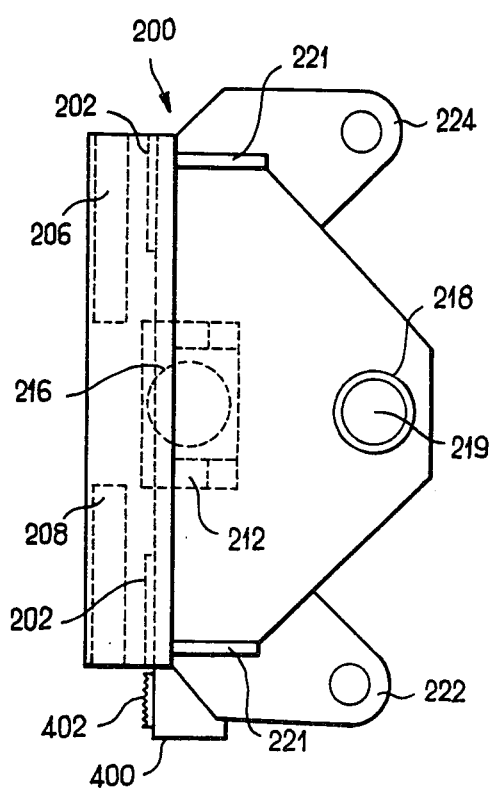
FIG. 5 shows a plan view of said tool-holder chassis.

214 denotes a window giving access to the hydraulic motor 300 provided with a toothed pinion 302 and intended to displace the tool-holder chassis with respect to the support. This motor, which has not been shown in FIGS. 4 and 5, is fixed by fastening means 304 on the fixing plate 210 and by fastening means 306 to the two shoulders 212. An opening 216 allows passage of the vertical rotating shaft 303 provided with the horizontal pinion 302 located beneath the plate and coming into contact with the rack by means of the lower part of the window 214. On the right-hand side of the Figure, locking means have also been schematically shown, which are constituted by a horizontal jack in a casing 400 and having a notched head 402 adapted to mesh on the rack in order to lock the tool-holder chassis at the desired spot. Of course, a symmetrical jack could be arranged on the other side of the tool-holder; in fact, an advantageous solution consists in producing a motor 300 provided with a system for locking the pinion 302, said motor simultaneously acting a role of displacement and of locking of the tool-holder chassis with respect to the assembly support. In order to be able to make complete use of the possibilities of sliding over the whole length of the guides, it is obvious that the dimensions of the rack are chosen so that the locking means may be in mesh even in the extreme positions of the tool-holder chassis.

Figure 6:
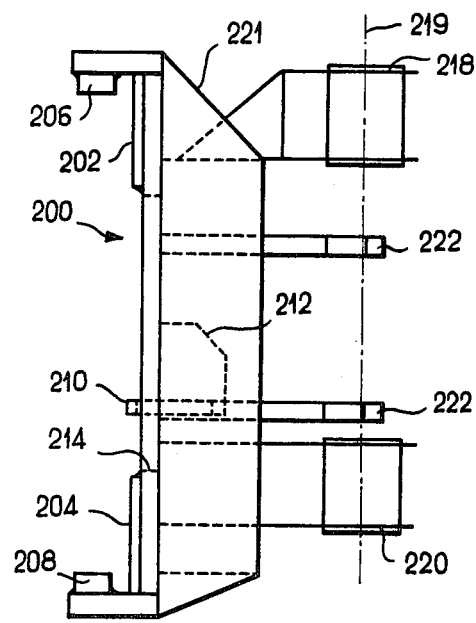
FIG. 6 shows a side view corresponding to a right hand view according to FIG. 4.

FIGS. 5 and 6, in which the jack 400 has not been shown, illustrate more clearly the form of the tool-holder chassis of the preferred embodiment. In addition to the elements which have already been mentioned in FIG. 4 and which consequently bear the same reference, 218 and 220 respectively denote two upper and lower tool support bearings. These two bearings constitute a vertical axis 219 about which the tool 56 of FIG. 1 may pivot. To this end, two pairs of pivot lugs 222 and 224 (left and right respectively) have been provided, on which pivot two horizontal jacks, controlled from the tractor, whose piston head is fixed to the tool 56 in order to rotate said latter about axis 219. Finally, 221 denotes two vertical bearing support sections intended to ensure the rigidity of the whole.

It will be noted that the presence of a tool-holder chassis 200 of the self-propelled type (motor 300 mounted on the chassis), in combination with the presence of the locking means, allows a displacement of the tool-holder chassis over the whole length of the guides, i.e. over the whole width of the vehicle: the integration of the drive means with the chassis clears the path of displacement of the tool-holder chassis both to the left and to the right of the vehicle. The locking means ensure the stability of the system in the most eccentric positions of the tool-holder. In such eccentric positions, the tool may work on the right-hand side or the left-hand side of the vehicle. Moreover, the possibility of pivoting the tool itself about a vertical axis offers a supplementary possibility of offsetting of the active part of the tool. Finally, the presence of hydraulic controls which it is possible to group in the driver's cab enables the above-described working unit to be easily used.

The invention is not to be understood as restricted to the details set forth, since these may be modified within the scope of the appended claims, without departing from the spirit and scope of the invention.

What is claimed is:

1. In a tractor vehicle, a working unit adapted to be mounted thereon comprising an assembly support provided with at least one guide, said assembly support having a rack extending parallel to said one guide, said support provided with at least two bearings which are pivotally mounted to said vehicle for pivotal movement of said support about a transverse horizontal axis, lugs mounted on said support and pivot cylinders mounted between said vehicle and said lugs to control the pivoting of said support about said transverse horizontal axis, a tool-holder chassis mounted to slide on the guide, a hydraulic motor mounted on the tool-holder chassis, said motor having a vertical rotating shaft driving at least one toothed pinion which cooperates with said rack to provoke the displacement of the tool-holder chassis along the whole of said guide, locking means adapted mechanically to lock the tool-holder chassis at all points of its path with respect to the guide.

2. The working unit of claim 1, wherein the locking means comprise a hydraulically actuated notched piston adapted to cooperate with the rack.

3. The working unit of claim 2, wherein the tool-holder chassis comprises two tool support bearings constituting a vertical axis and pivot lugs for at least one jack controlled from the tractor vehicle and intended to manoeuvre the tool in rotation along said vertical axis with respect to the support chassis.

4. The working unit of claim 3, wherein the hydraulic motor of the drive means is fixed to the tool-holder chassis by fastening means cooperating with a horizontal plate and perpendicular shoulders.

5. The working unit of claim 1, wherein the assembly support is reinforced by two rectangular tubes connected by crosspieces of the same type.

6. The working unit of claim 1, wherein the tool-holder chassis is provided with at least one pair of blocks and one pair of longitudinal members cooperating on either side of the guide in order to ensure the guiding of said tool-holder chassis on the assembly support.

7. The working unit of claim 6 wherein there are two parallel guides.

* * * * *